United States Patent
Hasegawa et al.

(10) Patent No.: US 11,312,815 B2
(45) Date of Patent: Apr. 26, 2022

(54) POLYURETHANE RESIN, PRODUCING METHOD OF POLYURETHANE RESIN, AND MOLDED ARTICLE

(71) Applicant: MITSUI CHEMICALS, INC., Tokyo (JP)

(72) Inventors: Daisuke Hasegawa, Bangkok (TH); Hidetaka Honda, Chiba (JP); Hiroshi Kanayama, Chiba (JP); Hirofumi Morita, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 249 days.

(21) Appl. No.: 16/612,057

(22) PCT Filed: May 9, 2018

(86) PCT No.: PCT/JP2018/017877
§ 371 (c)(1),
(2) Date: Nov. 8, 2019

(87) PCT Pub. No.: WO2018/207807
PCT Pub. Date: Nov. 15, 2018

(65) Prior Publication Data
US 2020/0165377 A1 May 28, 2020

(30) Foreign Application Priority Data

May 11, 2017 (JP) .............................. JP2017-094697

(51) Int. Cl.
*C08G 18/75* (2006.01)
*C08G 18/10* (2006.01)
*C08G 18/24* (2006.01)
*C08G 18/42* (2006.01)
*C08G 18/48* (2006.01)

(52) U.S. Cl.
CPC .......... *C08G 18/757* (2013.01); *C08G 18/10* (2013.01); *C08G 18/244* (2013.01); *C08G 18/4277* (2013.01); *C08G 18/4854* (2013.01)

(58) Field of Classification Search
CPC .................................................. C08G 18/757
See application file for complete search history.

(56) References Cited

U.S. PATENT DOCUMENTS

| | | | |
|---|---|---|---|
| 4,375,539 A | | 3/1983 | McBride et al. |
| 7,232,859 B2 * | | 6/2007 | Argyropoulos ........ C08G 18/12 |
| | | | 428/423.1 |
| 9,969,675 B2 * | | 5/2018 | Fukuda ................ C08G 18/757 |
| 2003/0036620 A1 * | | 2/2003 | Kawanabe ............. C08G 18/76 |
| | | | 528/44 |
| 2010/0216905 A1 | | 8/2010 | Kuwamura et al. |
| 2011/0028642 A1 * | | 2/2011 | Xie ...................... C08G 18/757 |
| | | | 524/590 |
| 2011/0033712 A1 | | 2/2011 | Xie et al. |
| 2012/0059124 A1 * | | 3/2012 | Shimazaki .......... H01L 21/6836 |
| | | | 525/127 |
| 2016/0238857 A1 | | 8/2016 | Yamasaki et al. |

FOREIGN PATENT DOCUMENTS

| | | |
|---|---|---|
| JP | S58-501123 A | 7/1983 |
| JP | H02-004817 A | 1/1990 |
| JP | H07-309827 A | 11/1995 |
| JP | 2001-151844 A | 6/2001 |
| JP | 2003-212835 A | 7/2003 |
| JP | 2004-244349 A | 9/2004 |
| JP | 2007-016188 A | 1/2007 |
| JP | 2011-006382 A | 1/2011 |
| JP | 2014-37505 A | 2/2014 |
| JP | 2014-055229 A | 3/2014 |
| WO | 2009/051114 A1 | 4/2009 |
| WO | 2015/046370 A1 | 4/2015 |

OTHER PUBLICATIONS

PCT International Preliminary Reporton Patentability (Form PCT/IB/373) filed in PCT/JP2018/017877, with PCT Notification Concerning Transmittal of International Preliminary Report on Patentability (Form PCT/IB/326) dated Nov. 21, 2019.
PCT International Preliminary Reporton Patentability (Form PCT/IB/373) filed in PCT/JP2018/017877, with PCT Notification of Transmittal of Translation of the International Preliminary Report on Patentability (Form PCT/IB/338) dated Nov. 21, 2019.
International Search Report dated Jul. 31, 2018 filed in PCT/JP2018/017877.

* cited by examiner

*Primary Examiner* — Michael M Dollinger
(74) *Attorney, Agent, or Firm* — Rankin, Hill & Clark LLP

(57) ABSTRACT

A polyurethane resin is a reaction product of a polyisocyanate component containing a bis(isocyanatomethyl)cyclohexane with a macropolyol component having a number average molecular weight of above 400 and 5000 or less. The shore A hardness thereof is 80 or less, a temperature at which a storage elastic modulus E' thereof shows $1 \times 10^6$ Pa is 200° C. or more, and a ratio ($E'_{150}/E'_{50}$) of a storage elastic modulus $E'_{150}$ at 150° C. with respect to a storage elastic modulus $E'_{50}$ at 50° C. is 0.1 or more and 1.4 or less.

7 Claims, No Drawings

POLYURETHANE RESIN, PRODUCING METHOD OF POLYURETHANE RESIN, AND MOLDED ARTICLE

TECHNICAL FIELD

The present invention relates to a polyurethane resin, a method for producing a polyurethane resin, and a molded article.

BACKGROUND ART

A polyurethane resin (polyurethane elastomer) is generally a rubber elastic body obtained by reaction of a polyisocyanate, a high molecular weight polyol (macropolyol), and a low molecular weight polyol (short-chain polyol), and includes a hard segment formed by reaction of the polyisocyanate with the low molecular weight polyol and a soft segment formed by reaction of the polyisocyanate with the high molecular weight polyol.

To be specific, as the polyurethane resin, a polyurethane resin (elastomer) obtained in the following manner has been proposed: a 1,4-bis(isocyanatomethyl)cyclohexane having a trans/cis ratio of 86/14 reacts with a adipate-type polyester polyol having a number average molecular weight of 2000, so that an isocyanate group-terminated prepolymer is synthesized; and the obtained isocyanate group-terminated prepolymer reacts with a 1,4-butanediol under the presence of a catalyst to obtain the polyurethane resin (ref: for example, Patent Document 1 (Synthesis Example 2, Example 2)).

CITATION LIST

Patent Document

Patent Document 1: International Publication No. WO2009/051114

SUMMARY OF THE INVENTION

Problem to be Solved by the Invention

Meanwhile, the polyurethane resin is required to retain the mechanical properties (breaking strength, breaking elongation) and to have relatively low hardness (for example, shore A hardness of 80 or less) in accordance with its uses.

However, the polyurethane resin obtained in Patent Document 1 has relatively high hardness (for example, above the shore A hardness of 80), so that it is not appropriate for the uses.

Then, to lower the hardness of the polyurethane resin, for example, a plasticizer may be added to the polyurethane resin. However, there is a disadvantage that the plasticizer easily causes bleeding over time, so that the heat resistance of the polyurethane resin is reduced.

Also, to lower the hardness of the polyurethane resin, for example, it has been considered that a trifunctional or more active hydrogen group-containing compound such as trimethylolpropane is used as a short-chain polyol. However, there is a disadvantage that the obtained polyurethane resin has low mechanical properties.

The present invention provides a polyurethane resin having excellent mechanical properties, heat resistance, and low hardness, a method for producing the polyurethane resin, and a molded article obtained from the polyurethane resin.

Means for Solving the Problem

The present invention [1] includes a polyurethane resin being a reaction product of a polyisocyanate component containing a bis(isocyanatomethyl)cyclohexane with a macropolyol component having a number average molecular weight of above 400 and 5000 or less, wherein the shore A hardness thereof is 80 or less, a temperature at which a storage elastic modulus E' thereof shows $1 \times 10^6$ Pa is 200° C. or more, and a ratio ($E'_{150}/E'_{50}$) of a storage elastic modulus $E'_{150}$ at 150° C. with respect to a storage elastic modulus $E'_{50}$ at 50° C. is 0.1 or more and 1.4 or less.

The present invention [2] includes the polyurethane resin described in the above-described [1], wherein the bis(isocyanatomethyl)cyclohexane is a 1,4-bis(isocyanatomethyl)cyclohexane.

The present invention [3] includes the polyurethane resin described in the above-described [2], wherein the 1,4-bis(isocyanatomethyl)cyclohexane contains a trans-isomer at a ratio of 70 mol % or more and 99 mol % or less.

The present invention [4] includes the polyurethane resin described in any one of the above-described [1] to [3], wherein the macropolyol component consists of a bifunctional polyol.

The present invention [5] includes the polyurethane resin described in any one of the above-described [1] to [4], wherein the macropolyol component contains a crystalline macropolyol that is solid at 15° C.

The present invention [6] includes a method for producing a polyurethane resin including a first step of obtaining a reaction mixture containing an isocyanate group-terminated prepolymer by reacting a polyisocyanate component containing a bis(isocyanatomethyl)cyclohexane with a macropolyol component having a number average molecular weight of above 400 and 5000 or less, and a second step of obtaining a polyurethane resin by reacting the reaction mixture obtained in the first step with a macropolyol component having a number average molecular weight of above 400 and 5000 or less, wherein in the first step, an equivalent ratio of an isocyanate group in the polyisocyanate component with respect to a hydroxyl group in the macropolyol component is 2 or more and 5 or less.

The present invention [7] includes a molded article containing the polyurethane resin described in any one of the above-described [1] to [5].

Effect of the Invention

In a polyurethane resin and a method for producing a polyurethane resin of the present invention, a polyisocyanate component contains a bis(isocyanatomethyl)cyclohexane, so that even when a short-chain polyol along with a macropolyol component does not react, in a reaction product of the bis(isocyanatomethyl)cyclohexane with the macropolyol component, a urethane bonding site of the bis(isocyanatomethyl)cyclohexane and the macropolyol component is aggregated, and a physically cross-linking structure can be formed.

Thus, the development of high hardness caused by the short-chain polyol is suppressed, and excellent mechanical properties and excellent heat resistance can be obtained even with relatively low hardness.

In addition, a number average molecular weight of the macropolyol component is within a specified range, so that the appropriate concentration of the urethane group can be ensured in the reaction product, and a polyurethane resin having mechanical properties, heat resistance, and low tackiness in good balance can be obtained.

Additionally, in the method for producing a polyurethane resin of the present invention, an equivalent ratio of an isocyanate group in the polyisocyanate component with respect to a hydroxyl group in the macropolyol component is 2 or more and 5 or less, so that an excellent physically cross-linking structure can be formed, and the improvement of the mechanical properties and the heat resistance can be further achieved.

DESCRIPTION OF EMBODIMENTS

A polyurethane resin of the present invention is a reaction product of a polyisocyanate component with a macropolyol component.

The polyisocyanate component contains a bis(isocyanatomethyl)cyclohexane as an essential component.

Examples of the bis(isocyanatomethyl)cyclohexane include 1,3-bis(isocyanatomethyl)cyclohexane and 1,4-bis(isocyanatomethyl)cyclohexane. These bis(isocyanatomethyl)cyclohexanes can be used alone or in combination of two or more.

When the 1,4-bis(isocyanatomethyl)cyclohexane and the 1,3-bis(isocyanatomethyl)cyclohexane are used in combination as the bis(isocyanatomethyl)cyclohexane, the mixing ratio thereof is appropriately set in accordance with its purpose and uses.

As the bis(isocyanatomethyl)cyclohexane, preferably, a 1,3-bis(isocyanatomethyl)cyclohexane is used alone or a 1,4-bis(isocyanatomethyl)cyclohexane is used alone, more preferably, a 1,4-bis(isocyanatomethyl)cyclohexane is used alone.

That is, though the details are described later, in the polyurethane resin of the present invention, a physically cross-linking structure is formed by an aggregation of a urethane bonding site of the bis(isocyanatomethyl)cyclohexane and the macropolyol component. The aggregation structure of the urethane bonding site is preferably uniform.

In this point, when the 1,3-bis(isocyanatomethyl)cyclohexane and the 1,4-bis(isocyanatomethyl)cyclohexane are used in combination, a molecule skeleton of each of the bis(isocyanatomethyl)cyclohexanes is different, so that a non-uniform aggregation structure may be caused.

Meanwhile, when the 1,3-bis(isocyanatomethyl)cyclohexane is used alone or the 1,4-bis(isocyanatomethyl)cyclohexane is used alone, the molecule skeleton of each of the bis(isocyanatomethyl)cyclohexanes is uniform, so that a uniform aggregation structure can be obtained, and the physically cross-linking structure can be efficiently formed.

As a result, the improvement of the mechanical properties of the polyurethane resin can be achieved by using the 1,3-bis(isocyanatomethyl)cyclohexane alone or the 1,4-bis(isocyanatomethyl)cyclohexane alone.

Among all, the 1,4-bis(isocyanatomethyl)cyclohexane has a symmetrical structure of the molecule skeleton, so that it can more preferably obtain the uniform aggregation structure than the 1,3-bis(isocyanatomethyl)cyclohexane that has an asymmetrical structure, and can efficiently form the physically cross-linking structure.

As a result, by using the 1,4-bis(isocyanatomethyl)cyclohexane alone, the mechanical properties of the polyurethane resin can be particularly excellently improved, and the improvement of the low tackiness can be achieved.

The 1,4-bis(isocyanatomethyl)cyclohexane includes a stereoisomer of cis-1,4-bis(isocyanatomethyl)cyclohexane (hereinafter, referred to as a cis-1,4 isomer) and trans-1,4-bis(isocyanatomethyl)cyclohexane (hereinafter, referred to as a trans-1,4 isomer). In the present invention, the 1,4-bis(isocyanatomethyl)cyclohexane contains the trans-1,4 isomer at a ratio of, for example, 60 mol % or more, preferably 70 mol % or more, more preferably 80 mol % or more, further more preferably 85 mol % or more, and for example, 99.8 mol % or less, preferably 99 mol % or less, more preferably 96 mol % or less, further more preferably, 90 mol % or less. In other words, in the 1,4-bis(isocyanatomethyl) cyclohexane, the total amount of the trans-1,4 isomer and the cis-1,4 isomer is 100 mol %, so that the cis-1,4 isomer is contained at a ratio of, for example, 0.2 mol % or more, preferably 1 mol % or more, more preferably 4 mol % or more, further more preferably 10 mol % or more, and for example, 40 mol % or less, preferably 30 mol % or less, more preferably 20 mol % or less, further more preferably 15 mol % or less.

When the content ratio of the trans-1,4 isomer is the above-described lower limit or more, the improvement of the mechanical properties such as breaking strength, tear strength, and compression permanent set, and the heat resistance can be achieved. When the content ratio of the trans-1,4 isomer is the above-described upper limit or less, the improvement of the mechanical properties such as breaking strength and the compression permanent set can be achieved.

The bis(isocyanatomethyl)cyclohexane can be produced from, for example, a commercially available bis(aminomethyl)cyclohexane and a bis(aminomethyl)cyclohexane obtained by a method described in Japanese Unexamined Patent Publication No. 2011-6382 by, for example, a heat and cold two-step phosgenation method (direct method) and a salification method described in Japanese Unexamined Patent Publication No. H7-309827 and Japanese Unexamined Patent Publication No. 2014-55229, and a non-phosgenation method described in Japanese Unexamined Patent Publication No. 2004-244349 and Japanese Unexamined Patent Publication No. 2003-212835.

The bis(isocyanatomethyl)cyclohexane can be also prepared as a modified product as long as the excellent effect of the present invention is not damaged.

Examples of the modified product of the bis(isocyanatomethyl)cyclohexane include multimers of the bis(isocyanatomethyl)cyclohexane (dimer (for example, uretodione modified product or the like); trimer (for example, isocyanurate modified product, iminooxadiazinedione modified product, or the like), or the like); biuret modified products (for example, biuret modified product or the like produced by reaction of the bis(isocyanatomethyl)cyclohexane with water); allophanate modified products (for example, allophanate modified product or the like produced by reaction of the bis(isocyanatomethyl)cyclohexane with a monohydric alcohol or a dihydric alcohol); polyol modified products (for example, polyol modified product (adduct) or the like produced by reaction of the bis(isocyanatomethyl)cyclohexane with a trihydric alcohol); oxadiazine trione modified products (for example, oxadiazine trione or the like produced by reaction of the bis(isocyanatomethyl)cyclohexane with a carbonic acid gas); and carbodiimide modified products (for example, carbodiimide modified product or the like produced by decarboxylation condensation reaction of the bis (isocyanatomethyl)cyclohexane).

The polyisocyanate component can also contain another polyisocyanate such as an aliphatic polyisocyanate, an aromatic polyisocyanate, and an araliphatic polyisocyanate as an optional component as long as the excellent effect of the present invention is not damaged.

Examples of the aliphatic polyisocyanate include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyl octane, 2,5,7-trimethyl-1,8-diisocyanate-5-isocyanatomethyl octane, bis(isocyanatoethyl)carbonate, bis(isocyanatoethyl)ether, 1,4-butylene glycol dipropylether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol, and 2,6-diisocyanatemethylcaproate.

An example of the aliphatic polyisocyanate includes an alicyclic polyisocyanate (excluding the bis(isocyanatomethyl)cyclohexane).

Examples of the alicyclic polyisocyanate (excluding the bis(isocyanatomethyl)cyclohexane) include isophorone diisocyanate (IPDI), trans-trans-, trans-cis-, and cis-cis-dicyclohexylmethane diisocyanate and a mixture thereof (hydrogenated MDI), 1,3- or 1,4-cyclohexane diisocyanate and a mixture thereof, 1,3- or 1,4-bis(isocyanatoethyl)cyclohexane, methylcyclohexane diisocyanate, 2,2'-dimethyldicyclohexylmethane diisocyanate, dimer acid diisocyanate, 2,5-diisocyanatomethylbicyclo[2,2,1]-heptane, 2,6-diisocyanatomethylbicyclo[2,2,1]-heptane (NBDI) that is an isomer thereof, 2-isocyanatomethyl-2-(3-isocyanatopropyl)-5-isocyanatomethylbicyclo-[2,2,1]-heptane, 2-isocyanatomethyl-2-(3-isocyanatopropyl)-6-isocyanatomethylbicyclo-[2,2,1]-heptane, 2-isocyanatomethyl-3-(3-isocyanatopropyl)-5-(2-isocyanatoethyl)-bicyclo-[2,2,1]-heptane. 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[1,2,2,1]-heptane, and 2-isocyanatomethyl-2-(3-isocyanatopropyl)-6-(2-isocyanatoethyl)-bicyclo-[2,2,1]-heptane.

Examples of the aromatic polyisocyanate include 2,4-tolylene diisocyanate, 2,6-tolylene diisocyanate, and an isomer mixture of the tolylene diisocyanate (TDI); 4,4'-diphenylmethane diisocyanate, 2,4'-diphenylmethane diisocyanate, 2,2'-diphenylmethane diisocyanate, and an optional isomer mixture of the diphenylmethane diisocyanate (MDI); toluidine diisocyanate (TODI); paraphenylene diisocyanate; and naphthalene diisocyanate (NDI).

Examples of the araliphatic polyisocyanate include 1,3- or 1,4-xylylene diisocyanate and a mixture thereof (XDI), and 1,3- or 1,4-tetramethylxylylene diisocyanate and a mixture thereof (TMXDI).

These other polyisocyanates can be used alone or in combination of two or more.

The other polyisocyanate can be also prepared as a modified product as long as the excellent effect of the present invention is not damaged.

Examples of the modified product of the other polyisocyanate include multimers (dimer, trimer, or the like), biuret modified products, allophanate modified products, polyol modified products, oxadiazinetrione modified products, and carbodiimide modified products of the other polyisocyanate.

The content ratio of the other polyisocyanate with respect to the total amount of the polyisocyanate component is, for example, 50 mass % or less, preferably 30 mass % or less, more preferably 20 mass % or less.

The polyisocyanate component can contain a monoisocyanate as an optional component as long as the excellent effect of the present invention is not damaged.

Examples of the monoisocyanate include methyl isocyanate, ethyl isocyanate, n-hexyl isocyanate, cyclohexyl isocyanate, 2-ethylhexyl isocyanate, phenyl isocyanate, and benzyl isocyanate.

The content ratio of the monoisocyanate with respect to the total amount of the polyisocyanate component is, for example, 20 mass % or less, preferably 10 mass % or less.

As the polyisocyanate component, preferably, a bis(isocyanatomethyl)cyclohexane is used alone. That is, the polyisocyanate component preferably consists of a bis(isocyanatomethyl)cyclohexane, more preferably consists of a 1,4-bis(isocyanatomethyl)cyclohexane.

In the present invention, the macropolyol component is a polyol component having a number average molecular weight of above 400 and 5000 or less. To be more specific, the macropolyol component does not contain a low molecular weight polyol (short-chain polyol) having a molecular weight of 400 or less, and consists of a high molecular weight polyol having a number average molecular weight of above 400 and 5000 or less.

The number average molecular weight of the macropolyol component (high molecular weight polyol) can be determined with measurement by a GPC method, or by a hydroxyl value and formulation of each of the components constituting the macropolyol component (high molecular weight polyol) (hereinafter, the same).

The high molecular weight polyol is a high molecular weight compound (preferably, a polymer) having two or more hydroxyl groups in a molecule, and to be specific, examples thereof include polyether polyol, polyester polyol, polycarbonate polyol, vegetable oil polyol, polyolefin polyol, and acrylic polyol.

Examples of the polyether polyol include polyoxyalkylene polyol, polytrimethylene ether glycol, and polytetramethylene ether polyol.

Examples of the polyether polyol include polyoxyalkylene polyol and polytetramethylene ether polyol.

The polyoxyalkylene polyol is, for example, an addition polymer of an alkylene oxide with a low molecular weight polyol and a known low molecular weight polyamine as an initiator.

An example of the low molecular weight polyol includes a compound (monomer) having two or more hydroxyl groups in a molecule and having a molecular weight of 50 or more and 400 or less. To be specific, examples of the low molecular weight polyol include polyhydric alcohols including dihydric alcohols such as C2-C4 alkanediol including ethylene glycol, 1,3-propylene glycol, 1,2-propylene glycol, 1,4-butylene glycol (1,4-butane diol, 1,4-BD), 1,3-butylene glycol, and 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, another C7 to C11 alkanediol, cyclohexanedimethanol (1,3- or 1,4-cyclohexanedimethanol and a mixture thereof), cyclohexanediol (1,3- or 1,4-cyclohexanediol and a mixture thereof), 1,4-dihydroxy-2-butene, 2,6-dimethyl-1-octene-3,8-diol, diethylene glycol, triethylene glycol, dipropylene glycol, 1,2-benzenediol (also known as catechol), 1,3-benzenediol, 1,4-benzenediol, bisphenol A, and hydrogenated product thereof; trihydric alcohols such as glycerin, trimethylolpropane, and triisopropanolamine; and tetrahydric alcohols such as tetramethylolmethane (pentaerythritol) and diglycerin.

These low molecular weight polyols can be used alone or in combination of two or more.

Examples of the alkylene oxide include propylene oxide, ethylene oxide, and butylene oxide. These alkylene oxides can be used alone or in combination of two or more. Among these, preferably, a propylene oxide and an ethylene oxide are used. Examples of the polyoxyalkylene polyol include a polyethylene glycol, a polypropylene glycol, and a random and/or block copolymer of a propylene oxide and an ethylene oxide.

An example of the polytrimethylene ether glycol includes a glycol obtained by a polycondensation reaction of 1,3-propanediol derived from plants.

Examples of the polytetramethylene ether polyol include a ring-opening polymer (polytetramethylene ether glycol (crystalline)) obtained by cationic polymerization of tetrahydrofuran and an amorphous (noncrystalline) polytetramethylene ether glycol that copolymerizes an alkyl-substituted tetrahydrofuran or the above-described dihydric alcohol with a polymerization unit of tetrahydrofuran.

An example of the polyester polyol includes a polycondensate obtained by allowing the above-described low molecular weight polyol to react with a polybasic acid under known conditions.

Examples of the polybasic acid include saturated aliphatic dicarboxylic acids (carbon number of 11 to 13) such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, and sebacic acid; unsaturated aliphatic dicarboxylic acids such as maleic acid, fumaric acid, and itaconic acid; aromatic dicarboxylic acids such as orthophthalic acid, isophthalic acid, terephthalic acid, toluene dicarboxylic acid, and naphthalene dicarboxylic acid; alicyclic dicarboxylic acids such as hexahydrophthalic acid; other carboxylic acids such as dimer acid, hydrogenated dimer acid, and HET acid; anhydrides derived from the carboxylic acids such as oxalic anhydrides, succinic anhydrides, maleic anhydrides, phthalic anhydrides, 2-alkyl (C12 to C18) succinic anhydrides, tetrahydrophthalic anhydrides, and trimellitic anhydrides; and furthermore, acid halides derived from the carboxylic acids such as oxalyl dichlorides, adipic acid dichlorides, and sebacic acid dichlorides.

An example of the polyester polyol includes a polyester polyol derived from plants, to be specific, a plant oil-based polyester polyol obtained by subjecting a hydroxy carboxylic acid such as hydroxyl group-containing vegetable oil fatty acid (for example, castor oil fatty acid containing a ricinoleic acid, hydrogenated castor oil fatty acid containing a 12-hydroxystearic acid, or the like) to condensation reaction under known conditions with the above-described low molecular weight polyol as an initiator.

Examples of the polyester polyol include a lactone-based polyester polyol including a polycaprolactone polyol and a polyvalerolactone polyol obtained by subjecting lactones such as ε-caprolactone and γ-valerolactone and lactides such as L-lactide and D-lactide to ring-opening polymerization with the above-described low molecular weight polyol (preferably, dihydric alcohol) as the initiator, and furthermore, a copolymer of these with the above-described dihydric alcohol.

Examples of the polycarbonate polyol include a ring-opening polymer (crystalline) of ethylene carbonate with the above-described low molecular weight polyol (preferably, the above-described dihydric alcohol) as an initiator and an amorphous polycarbonate polyol obtained by copolymerizing the dihydric alcohols such as 1,4-butanediol, 1,5-pentanediol, 3-methyl-1,5-pentanediol, and 1,6-hexanediol with the ring-opening polymer.

Examples of the vegetable oil polyol include hydroxyl group-containing vegetable oils such as castor oil and coconut oil. Also, examples thereof include a castor oil polyol and an ester-modified castor oil polyol obtained by allowing a castor oil fatty acid to react with a polypropylene polyol.

Examples of the polyolefin polyol include a polybutadiene polyol and a partially saponified ethylene-vinyl acetate copolymer.

An example of the acrylic polyol includes a copolymer obtained by copolymerizing a hydroxyl group-containing acrylate with a copolymerizable vinyl monomer that is copolymerizable with the hydroxyl group-containing acrylate.

Examples of the hydroxyl group-containing acrylate include 2-hydroxyethyl (meth)acrylate, hydroxypropyl (meth)acrylate, hydroxybutyl (meth)acrylate, 2,2-dihydroxymethylbutyl (meth)acrylate, polyhydroxyalkyl maleate, and polyhydroxyalkyl fumarate. Preferably, a 2-hydroxyethyl (meth)acrylate is used.

Examples of the copolymerizable vinyl monomer include alkyl (meth)acrylates (carbon number of 1 to 12) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, and cyclohexyl acylate; aromatic vinyls such as styrene, vinyltoluene, and α-methylstyrene; vinyl cyanides such as (meth)acrylonitrile; vinyl monomers containing a carboxyl group such as (meth)acrylic acid, fumaric acid, maleic acid, and itaconic acid or alkyl esters thereof; alkanepolyol poly(meth)acrylates such as ethyleneglycol di(meth)acrylate, butyleneglycol di(meth)acrylate, hexanediol di(meth)acrylate, and oligoethyleneglycol di(meth)acrylate; and vinyl monomers containing an isocyanate group such as 3-(2-isocyanate-2-propyl)-α-methylstyrene.

The acrylic polyol can be obtained by copolymerizing the hydroxyl group-containing acrylate with the copolymerizable vinyl monomer under the presence of an appropriate solvent and a polymerization initiator.

Examples of the acrylic polyol include a silicone polyol and a fluorine polyol.

An example of the silicone polyol includes an acrylic polyol in which a silicone compound containing a vinyl group such as γ-methacryloxypropyltrimethoxysilane is blended as a copolymerizable vinyl monomer in the copolymerization of the above-described acrylic polyol.

An example of the fluorine polyol includes an acrylic polyol in which a fluorine compound containing a vinyl group such as tetrafluoroethylene and chlorotrifluoroethylene is blended as a copolymerizable vinyl monomer in the copolymerization of the above-described acrylic polyol.

These high molecular weight polyols can be used alone or in combination of two or more.

As the high molecular weight polyol, preferably, a polyether polyol, a polyester polyol, and a polycarbonate polyol are used, more preferably, a polyether polyol and a polyester polyol are used, further more preferably, a polyethylene glycol, a polytetramethylene ether glycol, and a polycaprolactone polyol are used.

When the high molecular weight polyol is the above-described polyol, a molded article (described later) having excellent mechanical properties can be obtained.

A number average molecular weight of the high molecular weight polyol is, as described above, for example, above 400, preferably 600 or more, more preferably 1000 or more, further more preferably 1200 or more, and as described above, for example, 5000 or less, preferably 4000 or less, more preferably 3500 or less, further more preferably 2800 or less.

When the number average molecular weight of the high molecular weight polyol is within the above-described range, the forming of a physically cross-linking structure in the polyurethane resin is promoted, and as a result, the polyurethane resin having low hardness, breaking strength, breaking elongation, tear strength, heat resistance, compression permanent set, and low tackiness in good balance can be obtained.

To be specific, when the number average molecular weight of the high molecular weight polyol is the above-described upper limit value or less, an excessive reduction in the concentration of the urethane group in the polyurethane resin can be suppressed, and a reduction in the properties such as a reduction in the strength, a reduction in the heat resistance, and an increase in the tackiness derived from the shortage of the urethane group can be suppressed. Meanwhile, when the number average molecular weight thereof is above the above-described lower limit value (or the above-described lower limit value or more), an excessive increase in the concentration of the urethane group in the polyurethane resin can be suppressed and an increase in the hardness derived from the excessive urethane group can be suppressed, so that the improvement of the low hardness can be achieved and a reduction in the properties such as a reduction in the elasticity, a reduction in the elongation, and an increase in the compression permanent set can be suppressed.

An average functional group number of the high molecular weight polyol is, for example, 1.5 or more, preferably 1.8 or more, more preferably 2 or more, and for example, 6 or less, preferably 4 or less, more preferably 3 or less, further more preferably 2 or 3, particularly preferably 2.

That is, as the high molecular weight polyol, preferably, a bifunctional polyol and a trifunctional polyol are used, particularly preferably, a bifunctional polyol is used.

In other words, the macropolyol component preferably contains a bifunctional polyol and/or a trifunctional polyol, more preferably contains a bifunctional polyol alone.

When the macropolyol component contains the bifunctional polyol, the intermolecular interaction of a soft segment phase derived from the macropolyol component can be improved, and the polyurethane resin having excellent breaking strength, breaking elongation, and tear strength can be obtained.

As the bifunctional polyol, preferably, a polyether diol, a polyester diol, and a polycarbonate diol are used.

The high molecular weight polyol is classified into a crystalline macropolyol that is solid at 15° C. and an amorphous (noncrystalline) macropolyol that is liquid at 15° C.

As the high molecular weight polyol, preferably, a crystalline macropolyol that is solid at 15° C. is used.

That is, the macropolyol component preferably contains the crystalline macropolyol that is solid at 15° C., more preferably contains the crystalline macropolyol that is solid at 15° C. alone.

When the macropolyol component contains the crystalline macropolyol, the intermolecular interaction of the soft segment phase derived from the macropolyol component can be improved, and the improvement of the mechanical properties, the heat resistance, and the low tackiness can be achieved.

To be specific, examples of the crystalline macropolyol include crystalline polyether diol, crystalline polyester diol, and crystalline polycarbonate diol. Examples of the crystalline polyether diol include polyethylene glycol, polytrimethylene ether glycol, and polytetramethylene ether glycol. Examples of the crystalline polyester diol include polyester diol obtained by reaction of a dihydric alcohol with a straight-chain aliphatic dicarboxylic acid and a ring-opening polymer of ε-caprolactone with the dihydric alcohol as an initiator. An example of the crystalline polycarbonate diol includes a ring-opening polymer of ethylene carbonate with the dihydric alcohol as an initiator.

The polyurethane resin is, for example, as described in the following, obtained by reacting the polyisocyanate component with the macropolyol component.

To react the polyisocyanate component with the macropolyol component, for example, a known method such as one shot method and prepolymer method is used. Preferably, a prepolymer method is used.

When each of the components described above reacts by the prepolymer method, the excellent physically cross-linking structure can be formed, and the polyurethane resin having excellent mechanical properties can be obtained.

To be specific, in the prepolymer method, first, the polyisocyanate component containing the bis(isocyanatomethyl) cyclohexane reacts with the macropolyol component having a number average molecular weight of above 400 and 5000 or less, so that a reaction mixture containing an isocyanate group-terminated prepolymer (that is, a mixture (reaction liquid) of the isocyanate group-terminated prepolymer produced by reaction of the polyisocyanate component with the macropolyol component and an excessive polyisocyanate component (isocyanate monomer)) is obtained (first step, prepolymer synthesis step).

In the first step (prepolymer synthesis step), the polyisocyanate component reacts with the macropolyol component by, for example, a polymerization method such as bulk polymerization and solution polymerization.

In the bulk polymerization, for example, under a nitrogen gas stream, the polyisocyanate component reacts with the macropolyol component at a reaction temperature of, for example, 50° C. or more, and for example, 250° C. or less, preferably 200° C. or less for, for example, 0.5 hours or more, and for example, 15 hours or less.

In the solution polymerization, the polyisocyanate component and the macropolyol component are added to an organic solvent to react at a reaction temperature of, for example, 50° C. or more, and for example, 120° C. or less, preferably 100° C. or less for, for example, 0.5 hours or more, and for example, 15 hours or less.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethyl benzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, and ethyl-3-ethoxypropionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methyl pyrrolidone, dimethyl formamide, N,N'-dimethylacetamide, dimethyl sulfoxide, and hexamethylphosphonylamide.

Furthermore, in the above-described polymerization reaction, for example, a known urethane-formation catalyst such as amines and organic metal compound can be added as needed.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate, dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octenoate; and organic bismuth compounds such as bismuth octanoate (bismuth octylate) and bismuth neodecanoate, and preferably, a tin octylate and a bismuth octylate are used.

Furthermore, examples of the urethane-formation catalyst include potassium salts such as potassium carbonate, potassium acetate, and potassium octylate.

These urethane-formation catalysts can be used alone or in combination of two or more.

The addition ratio of the urethane-formation catalyst with respect to 10000 parts by mass of the total amount of the polyisocyanate component and the macropolyol component blended in the first step is, for example, 0.001 parts by mass or more, preferably 0.01 parts by mass or more, and for example, 1 part by mass or less, preferably 0.5 parts by mass or less.

In the above-described polymerization reaction, when an organic solvent is used, the organic solvent can be removed by, for example, a known removing method such as distillation and extraction.

In the first step, as the mixing ratio of each of the components, an equivalent ratio (isocyanate group/hydroxyl group) of the isocyanate group in the polyisocyanate component with respect to the hydroxyl group in the macropolyol component is, for example, 1.5 or more, preferably 1.8 or more, more preferably 2 or more, further more preferably 2.5 or more, and for example, 10 or less, preferably 7 or less, more preferably 5 or less, further more preferably 4 or less.

When the equivalent ratio in the first step is the above-described lower limit or more, an excessive increase in the viscosity of the reaction mixture to be obtained (containing the isocyanate group-terminated prepolymer) can be suppressed, and the improvement of the mixing properties and the compatibility in a second step (described later) can be achieved. As a result, the polyisocyanate component can uniformly react with the macropolyol component, and as a result, the excellent physically cross-linking structure can be formed.

When the equivalent ratio in the first step is the above-described upper limit or less, an excessive increase of the isocyanate monomer in the reaction mixture (containing the isocyanate group-terminated prepolymer) obtained in the first step can be suppressed. Thus, at the time of the reaction in the second step (described later), excessive reaction of the isocyanate monomer in the reaction mixture obtained in the first step with the macropolyol component is suppressed, and the isocyanate monomer and the isocyanate group-terminated prepolymer can uniformly react with the macropolyol component, so that the excellent physically cross-linking structure can be formed.

To be more specific, as the mixing ratio of each of the components in the prepolymer synthesis step, the mixing ratio of the polyisocyanate component with respect to 100 parts by mass of the macropolyol component is, for example, 5 parts by mass or more, preferably 10 parts by mass or more, more preferably 15 parts by mass or more, and for example, 100 parts by mass or less, preferably 70 parts by mass or less, more preferably 50 parts by mass or less, further more preferably 30 parts by mass or less.

In this method, the above-described components react until the content ratio of the isocyanate group reaches, for example, 1 mass % or more, preferably 3 mass % or more, more preferably 4 mass % or more, and for example, 30 mass % or less, preferably 19 mass % or less, more preferably 16 mass % or less, further more preferably 15 mass % or less, further more preferably 10 mass % or less. In this manner, the reaction mixture containing the isocyanate group-terminated prepolymer (isocyanate group-terminated polyurethane prepolymer) can be obtained.

The isocyanate group content (content ratio of the isocyanate group) can be obtained by a known method such as titration method with di-n-butylamine and FT-IR analysis.

The reaction mixture obtained in the above-described reaction usually contains an unreacted polyisocyanate component (isocyanate monomer) in addition to the isocyanate group-terminated prepolymer.

In the first step, the unreacted isocyanate monomer can be removed from the reaction mixture obtained in the above-described reaction by a known method such as distillation method and extraction method. Preferably, the unreacted isocyanate monomer is not removed. That is, in this method, the reaction mixture obtained in the first step is used as it is in the second step to be described later.

Next, in this method, the reaction mixture obtained as described above reacts with the macropolyol component having a number average molecular weight of above 400 and 5000 or less, so that the polyurethane resin is obtained (second step).

That is, in this method, the macropolyol component (high molecular weight polyol) is used instead of a chain extension agent (low molecular weight polyol) in the usual prepolymer method.

In other words, a portion of the macropolyol component is used in the above-described first step, and the remaining portion of the macropolyol component is used in the second step.

The macropolyol component (portion of the macropolyol component) used in the first step and the macropolyol component (remaining portion of the macropolyol component) used in the second step may contain the same kind of high molecular weight polyol, or may contain the different kind of high molecular weight polyol.

In view of achievement of the uniformity of the physically cross-linking structure of the polyurethane resin, the macropolyol component (portion of the macropolyol component) used in the first step and the macropolyol component (remaining portion of the macropolyol component) used in the second step preferably contain the same kind of high molecular weight polyol, more preferably consist of the same kind of high molecular weight polyol.

In the second step, the reaction mixture obtained in the first step reacts with the macropolyol component by, for example, a polymerization method such as the above-described bulk polymerization and the above-described solution polymerization.

The reaction temperature is, for example, a room temperature or more, preferably 50° C. or more, and for example, 200° C. or less, preferably 150° C. or less, and the reaction time is, for example, 5 minutes or more, preferably 1 hour or more, and for example, 72 hours or less, preferably 48 hours or less.

As the mixing ratio of each of the components, the equivalent ratio (isocyanate group/hydroxyl group) of the isocyanate group in the reaction mixture obtained in the first step with respect to the hydroxyl group in the macropolyol component is, for example, 0.75 or more, preferably 0.9 or more, and for example, 1.3 or less, preferably 1.2 or less.

To be more specific, as the mixing ratio of each of the components in the second step, the ratio of the macropolyol component with respect to 100 parts by mass of the reaction mixture obtained in the first step is, for example, 60 parts by mass or more, preferably 100 parts by mass or more, more preferably 120 parts by mass or more, and for example, 170 parts by mass or less, preferably 160 parts by mass or less, more preferably 150 parts by mass or less.

Furthermore, in the reaction, the above-described urethane-formation catalyst can be added as needed. The urethane-formation catalyst can be blended in the reaction mixture obtained in the first step and/or the macropolyol component, and also can be separately blended at the time of the mixture of these.

As the method for obtaining the above-described polyurethane resin, when the one shot method is used, the polyisocyanate component and the macropolyol component are simultaneously blended to be stirred and mixed at such a ratio that the equivalent ratio (isocyanate group/hydroxyl group) of the isocyanate group in the polyisocyanate component with respect to the hydroxyl group in the macropolyol component is, for example, 0.75 or more, preferably 0.9 or more, and for example, 1.3 or less, preferably 1.2 or less.

The stirring and mixing is, for example, carried out under an inert gas (for example, nitrogen) atmosphere at a reaction temperature of, for example, 40° C. or more, preferably 100° C. or more, and for example, 280° C. or less, preferably 260° C. or less and a reaction time of, for example, 30 seconds or more and 1 hour or less.

The method for the stirring and mixing is not particularly limited, and a method for the stirring and mixing by using a known mixing device such as mixing tank equipped with a disper, a dissolver, and a turbine blade, circulation-type low pressure or high pressure impingement mixing device, high-speed stirring mixer, static mixer, kneader, uniaxial or biaxial rotation extruder, and belt conveyor is used.

At the time of the stirring and mixing, the above-described urethane-formation catalyst and the above-described organic solvent can be added at an appropriate ratio as needed.

Also, the polyurethane resin obtained as described above can be subjected to heat treatment (heat curing) as needed.

In the heat treatment, the heat treatment temperature and the heat treatment period are not particularly limited, and appropriately set in accordance with its purpose and uses.

Also, a known additive can be added to the polyurethane resin as needed. Examples thereof include antioxidants, heat resistant stabilizers, ultraviolet absorbers, light resistant stabilizers, furthermore, blocking inhibitors, release agents, pigments, dyes, lubricants, fillers, hydrolysis inhibitors, corrosion inhibitors, filler materials, and bluing agents. These additives may be added at the time of the mixture, at the time of the synthesis, or after the synthesis of each of the components.

The heat resistant stabilizer is not particularly limited, and a known heat resistant stabilizer (for example, described in a catalog of BASF Japan Ltd.) is used. To be more specific, examples thereof include phosphorus-based processing heat stabilizer, lactone-based processing heat stabilizer, and sulfur-based processing heat stabilizer.

The ultraviolet absorber is not particularly limited, and a known ultraviolet absorber (for example, described in a catalog of BASF Japan Ltd.) is used. To be more specific, examples thereof include benzotriazole ultraviolet absorber, triazine ultraviolet absorber, and benzophenone ultraviolet absorber.

The light resistant stabilizer is not particularly limited, and a known light resistant stabilizer (for example, described in a catalog of ADEKA CORPORATION) is used. To be more specific, examples thereof include benzoate light stabilizer and hindered amine light stabilizer.

Each of these additives is added with respect to the polyurethane resin at a ratio of, for example, 0.01 mass % or more, preferably 0.1 mass % or more, and for example, 3.0 mass % or less, preferably 2.0 mass % or less.

In the polyurethane resin and the method for producing a polyurethane resin, the polyisocyanate component contains the bis(isocyanatomethyl)cyclohexane, so that even when the short-chain polyol along with the macropolyol component does not react, in the reaction product of the bis(isocyanatomethyl)cyclohexane with the macropolyol component, the urethane bonding site of the bis(isocyanatomethyl)cyclohexane and the macropolyol component is aggregated, and the physically cross-linking structure can be formed.

Thus, the development of high hardness caused by the short-chain polyol is suppressed, and excellent mechanical properties and excellent heat resistance can be obtained even with relatively low hardness.

In addition, the number average molecular weight of the macropolyol component is within a specified range, so that the appropriate concentration of the urethane group can be ensured in the reaction product, and the polyurethane resin having mechanical properties, heat resistance, and low tackiness in good balance can be obtained.

To be more specific, the above-described polyurethane resin is obtained by reacting the polyisocyanate component containing the bis(isocyanatomethyl)cyclohexane with the macropolyol component having a number average molecular weight of above 400 and 5000 or less.

That is, in the above-described polyurethane resin, as the polyol component, the excessively high molecular weight polyol of a molecular weight of above 5000 is not used. Thus, an excessive reduction in the concentration of the urethane group in the polyurethane resin can be suppressed, and a reduction in the properties such as a reduction in the strength, a reduction in the heat resistance, and an increase in the tackiness derived from the shortage of the urethane group can be suppressed.

In the above-described polyurethane resin, as the polyol component, the short-chain polyol (low molecular weight polyol having a molecular weight of 400 or less) is not used. Thus, an excessive increase in the concentration of the urethane group in the polyurethane resin can be suppressed and an increase in the hardness derived from the excessive urethane group can be suppressed, so that the low hardness can be achieved and a reduction in the properties such as a reduction in the elasticity, a reduction in the elongation, and an increase in the compression permanent set can be suppressed.

Meanwhile, usually, when the short-chain polyol is not used, a hard segment based on the short-chain polyol is not formed, so that even when the polyurethane resin has relatively low hardness, it may have poor mechanical strength and poor heat resistance.

However, in the above-described polyurethane resin, the polyisocyanate component contains the bis(isocyanatomethyl)cyclohexane.

In the polyisocyanate component, the bis(isocyanatomethyl)cyclohexane has a molecule structure that is relatively easily aggregated compared to another isocyanate. Among all, the 1,4-bis(isocyanatomethyl)cyclohexane has a symmetrical molecule structure.

Thus, when the urethane bonding formed by the reaction of the bis(isocyanatomethyl)cyclohexane with the macropolyol is aggregated, in the aggregation portion, the physically cross-linking structure is formed, and excellent mechanical strength and excellent heat resistance can be developed even with the relatively low hardness.

Thus, the polyurethane resin of the present invention has relatively low hardness without containing a plasticizer, has excellent mechanical properties (elasticity, mechanical strength), and furthermore, has excellent low tackiness.

In addition, in the method for producing a polyurethane resin of the present invention, when the equivalent ratio of the isocyanate group in the polyisocyanate component with respect to the hydroxyl group in the macropolyol component is 2 or more and 5 or less, the excellent physically cross-linking structure can be formed, and the improvement of the mechanical properties and the heat resistance can be further achieved.

To be specific, in the above-described method for producing a polyurethane resin, when the equivalent ratio in the first step is 2 or more, the excessive increase in the viscosity of the reaction mixture to be obtained can be suppressed, and the improvement of the mixing properties and the compatibility in the second step can be achieved. As a result, the polyisocyanate component and the macropolyol component can uniformly react and as a result, the excellent physically cross-linking structure can be formed.

In the method for producing a polyurethane resin, when the equivalent ratio in the first step is 5 or less, an excessive increase of the isocyanate monomer in the reaction mixture containing the isocyanate group-terminated prepolymer can be suppressed. Thus, at the time of the reaction in the second step, excessive reaction of the isocyanate monomer in the reaction mixture obtained in the first step with the macropolyol component is suppressed, and the isocyanate monomer and the isocyanate group-terminated prepolymer can uniformly react with the macropolyol component, so that the excellent physically cross-linking structure can be formed.

As a result, according to the above-described method for producing a polyurethane resin, the polyurethane resin having excellent mechanical properties and heat resistance, and furthermore, having excellent high elasticity and low tackiness even with relatively low hardness can be produced.

As described above, the polyurethane resin does not use the short-chain polyol as the polyol component, so that the development of the high hardness caused by the short-chain polyol is suppressed, and the polyurethane resin has relatively low hardness.

To be specific, the shore A hardness (in conformity with JIS K7311 (1995)) of the polyurethane resin is, for example, 80 or less, preferably 79 or less, more preferably 75 or less, and for example, 40 or more, preferably 45 or more, more preferably 50 or more.

As described above, the above-described polyurethane resin has the physically cross-linking structure caused by the aggregation of the urethane bonding site even when the short-chain polyol is not used as the polyol component. Thus, the polyurethane resin has excellent heat resistance, and a softening temperature thereof is relatively high.

The softening temperature of the polyurethane resin is defined as a temperature at which a storage elastic modulus E' by dynamic viscoelasticity measurement in a tensile measurement mode of the polyurethane resin shows $1 \times 10^6$ Pa (that is, the temperature at which the storage elastic modulus E' reaches $1 \times 10^6$ Pa in a dynamic viscoelasticity spectrum in a temperature region (rubber-state region) that is higher than a glass transition temperature (Tg)).

In the above-described polyurethane resin, the temperature at which the storage elastic modulus E' shows $1 \times 10^6$ Pa (that is, the softening temperature of the polyurethane resin) is, for example, 200° C. or more, preferably 205° C. or more, more preferably 210° C. or more, further more preferably 215° C. or more, particularly preferably 220° C. or more, and for example, 300° C. or less.

A ratio ($E'_{150}/E'_{50}$) of a storage elastic modulus $E'_{150}$ at 150° C. with respect to a storage elastic modulus $E'_{50}$ at 50° C. of the polyurethane resin is, for example, 0.1 or more, preferably 0.5 or more, more preferably 0.8 or more, further more preferably 0.85 or more, particularly preferably 0.9 or more, and for example, 1.4 or less, preferably 1.3 or less, more preferably 1.2 or less, further more preferably 1.1 or less, particularly preferably 1.05 or less.

That is, the above-described polyurethane resin has the physically cross-linking structure caused by the aggregation of the urethane bonding site even when the short-chain polyol is not used as the polyol component, and has excellent intermolecular interaction of the soft segment phase derived from the macropolyol component.

Thus, the above-described polyurethane resin has stability with respect to a temperature change, and among all, shows excellent stability in a temperature region between 50° C. and 150° C. As a result, the above-described polyurethane resin can suppress the upper and lower change of the storage elastic modulus in the above-described temperature region, and the ratio ($E'_{150}/E'_{50}$) of the storage elastic modulus E' is the above-described lower limit or more. The above-described polyurethane resin can suppress the development of the entropy elasticity caused by the temperature change, so that the ratio ($E'_{150}/E'_{50}$) of the storage elastic modulus E' is the above-described upper limit or less.

The polyurethane resin is produced as TPU (thermoplastic polyurethane resin), TSU (thermosetting polyurethane resin), or the like, and used in the production of molded articles in various industrial uses in accordance with the molding method such as melt molding and injection molding.

The present invention includes a molded article containing the above-described polyurethane resin of the present invention. The molded article is molded from the polyurethane resin.

To be specific, the molded article can be, for example, obtained by molding the above-described polyurethane resin into various shapes such as pellet shape, plate shape, fiber shape, strand shape, film shape, sheet shape, pipe shape, hollow shape, box shape, and button shape by a known molding method. Examples of the known molding method include thermal compression molding and injection molding by using a specific mold, extrusion molding by using a sheet winding device, and thermal molding process method such as melt-spinning molding.

The obtained molded article contains the above-described polyurethane resin, so that it has excellent heat resistance, low tackiness, elasticity, and mechanical strength.

Thus, the molded article can be industrially widely available. To be specific, for example, the molded article is preferably used in transparent hard plastics, coating materials, pressure-sensitive adhesives, adhesives, waterproof agents, potting agents, ink, binder, films, sheets, bands (for example, bands such as watch bands, and belts such as transmission belts for automobiles and conveyance belts (conveyor belt) for various industrial uses), tubes (for example, components such as medical tubes and catheters, in addition, tubes such as air tubes, hydraulic tubes, and electric wire tubes, and hoses such as fire hoses), blades, loudspeakers, sensors, high-luminance LED sealants, organic EL members, solar power generation members, robot members, android members, wearable members, clothing goods, sanitary goods, cosmetic articles, food packaging members, sports articles, leisure goods, medical supplies, nursing care articles, members for housing, audio members, lighting members, chandeliers, outside lights, sealing members, sealing materials, corks, packings, vibration-proof vibration-control-base isolation members, soundproof members, daily necessities, miscellaneous goods, cushions, beddings, stress absorbers, stress relievers, automobile interior and exterior components, railway members, aircraft members, optical members, members for OA equipment, protecting members for surfaces of miscellaneous goods, semiconductor sealing materials, self-repairing materials, health equipment, glass lens, toys, packings, cable sheaths, wire harnesses, telecommunication cables, automobile wires, computer wires, and industrial goods such as curled cord, nursing care articles such as sheets and film, sports articles, leisure goods, various miscellaneous goods, vibration-proof base isolation materials, impact absorbers, optical materials, films such as optical guiding films, automobile components, surface protecting sheets, decorative sheets, transfer sheets, tape members such as semiconductor protecting tapes, outsoles, golf ball members, strings for tennis rackets, films for agriculture, wall paper, defogging imparting agents, threads, fibers, non-woven fabrics, furniture such as mattress and sofa, clothing goods such as brassiere and shoulder pad, medical supplies such as buffer materials of paper diaper, napkin, and medical tape, cosmetics, sanitary goods such as facial washing puff and pillow, shoes articles such as sole (outsole) and midsole, furthermore, body pressure distribution goods such as pad and cushion for vehicles, members touched with a hand such as door trim, instrument panel, and gear knob, heat insulating materials of electric refrigerator and building, shock absorbing materials such as shock absorber, filler, vehicle goods such as vehicle handle, automobile interior member, and automobile exterior member, and semiconductor production articles such as chemical mechanical polishing (CMP) pad.

Furthermore, the above-described molded article is preferably used for uses in which the recoverability and abrasion resistance are required for repeating expansion and contraction, compressive deformation, or the like. Examples of the uses include coating materials (coating materials such as film, sheet, belt, wire, electric wire, rotating machine made of metal, wheel, and drill), threads and fibers (threads and conjugated fibers used for tube, tights, spats, sportswear, and swimsuit), uses for extrusion and molding (uses for extrusion and molding for guts for tennis and badminton, and convergence materials thereof), slash molded article in a powder shape by micropellet-formation, artificial leathers, skins, sheets, packings, covering rolls (covering roll for steel), stickers, sealants, rollers, gears, tablet covers, covers or core materials for balls (covers or core materials for golf ball, basketball, tennis ball, volleyball, and soft ball), shoes members (cover material, midsole, outsole, or the like), ski goods, boots, tennis goods, grips (grips for golf club and two-wheeled vehicle), automobile interior and exterior members, rack boots, windshield wipers, seat cushion members, robots, films for nursing care articles, 3D printer molded articles, fiber-reinforced materials (fiber-reinforced materials for carbon fiber, lignin, kenaf, nano-cellulose fiber, and glass fiber), safety goggles, sunglasses, glass frames, ski goggles, swimming goggles, contact lenses, foaming molded articles of gas assist, shock absorbers, CMP polishing pads, dampers, bearings, dust covers, cutting valves, chipping rolls, high-speed rotation rollers, tires, sensors, watches and wearable bands.

EXAMPLES

Next, the present invention is described based on Production Examples, Synthesis Examples, Examples, and Comparative Examples. The present invention is however not limited by these Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

1) Material

<Polyisocyanate Component (a)>

1,4-BIC: 1,4-bis(isocyanatomethyl)cyclohexane synthesized by the method described in Production Examples 1 to 5 to be described later 1,3-BIC: 1,3-bis(isocyanatomethyl)cyclohexane, trade name: TAKENATE 600, manufactured by Mitsui Chemicals, Inc.

<Macropolyol Component (b)> b-1) PTMEG (number average molecular weight: 250, noncrystalline polyol, bifunctional polyol): polytetramethylene ether glycol, trade name: TERATHANE 250, hydroxyl value: 448.5 mgKOH/g, manufactured by INVISTA K.K.

b-2) PTMEG (number average molecular weight: 650, crystalline macropolyol, bifunctional polyol): polytetramethylene ether glycol, trade name: PTG 650SN, hydroxyl value: 172.8 mgKOH/g, manufactured by Hodogaya Chemical Co., Ltd.

b-3) PTMEG (number average molecular weight: 1000, crystalline macropolyol, bifunctional polyol): polytetramethylene ether glycol, trade name: PTG 1000, hydroxyl value: 112.3 mgKOH/g, manufactured by Hodogaya Chemical Co., Ltd.

b-4) PTMEG (number average molecular weight: 2000, crystalline macropolyol, bifunctional polyol): polytetramethylene ether glycol, trade name: PTG 2000SN, hydroxyl value: 56.1 mgKOH/g, manufactured by Hodogaya Chemical Co., Ltd.

b-5) PTMEG (number average molecular weight: 3000, crystalline macropolyol, bifunctional polyol): polytetramethylene ether glycol, trade name: PTG 2000SN, hydroxyl value: 37.3 mgKOH/g, manufactured by Hodogaya Chemical Co., Ltd.

b-6) PCL (number average molecular weight: 2000, crystalline macropolyol, bifunctional polyol): polycaprolactone polyol, trade name: PLACCEL 220N, hydroxyl value: 56.4 mgKOH/g, manufactured by Daicel Corporation b-7) Polycarbonate diol (number average molecular weight: 2000, crystalline macropolyol, bifunctional polyol): trade name: UH-200, hydroxyl value: 56.2 mgKOH/g, manufactured by UBE INDUSTRIES, LTD.

b-8) Polybutylene adipate (number average molecular weight: 2000, crystalline macropolyol, bifunctional polyol): trade name: TAKELAC U-2420 (adipate-type polyester polyol), hydroxyl value: 56.3 mgKOH/g, manufactured by Mitsui Chemicals, Inc.

b-9) PEG (number average molecular weight: 4000, crystalline macropolyol, bifunctional polyol): prepared by blending polyethylene glycol, trade name: PEG #4000, hydroxyl value: 36.4 mgKOH/g (number average molecular weight of 3082), manufactured by NOF CORPORATION with polyethylene glycol, trade name: PEG #6000, hydroxyl value: 12.8 mgKOH/g (number average molecular weight of 8765), manufactured by NOF CORPORATION at a weight ratio of 84:16.

b-10) PEG (number average molecular weight: 6000, crystalline macropolyol, bifunctional polyol): prepared by blending polyethylene glycol, trade name: PEG #4000, hydroxyl value: 36.4 mgKOH/g (number average molecular weight of 3082), manufactured by NOF CORPORATION with polyethylene glycol, trade name: PEG #6000, hydroxyl value: 12.8 mgKOH/g (number average molecular weight of 8765), manufactured by NOF CORPORATION at a weight ratio of 49:51.

b-11) PTXG (number average molecular weight: 1800, noncrystalline macropolyol, bifunctional polyol): copolymerization polytetramethylene ether glycol, trade name: PTXG1800, hydroxyl value: 62.3 mgKOH/g, manufactured by Asahi Kasei Corporation b-12) EP-505S (number average molecular weight: 3000, noncrystalline macropolyol, trifunctional polyol): polyether triol, trade name: ACTCOL EP-505S, hydroxyl value: 56.2 mgKOH/g, manufactured by Mitsui Chemicals & SKC Polyurethanes In the following, when the prepolymer method is used, the macropolyol component used in the first step may be referred to as a macropolyol component ($b^1$) and the macropolyol component used in the second step may be referred to as a macropolyol component ($b^2$).

<Short-Chain Diol (c)>

1,4-BD: 1,4-butanediol, trade name: 1,4-butanediol, manufactured by Mitsubishi Chemical Corporation TMP: trimethylolpropane, trade name: trimethylolpropane, manufactured by Mitsubishi Chemical Corporation <Catalyst>

Tin octylate (II), trade name: STANOCT, manufactured by API Corporation

<Plasticizer>

Diisononyl adipate: trade name: DINA, manufactured by DAIHACHI CHEMICAL INDUSTRY CO., LTD.

<Stabilizer>

Antioxidant: hindered phenol compound, trade name: IRGANOX 245, manufactured by BASF Japan Ltd.

Ultraviolet absorber: benzotriazole compound, trade name: TINUVIN 234, manufactured by BASF Japan Ltd.

Light resistant stabilizer: hindered amine compound, trade name: LA-72, manufactured by ADEKA CORPORATION 2) Production of Polyurethane Resin <Production of 1,4-bis(isocyanatomethyl)cyclohexane (1,4-$H_6$XDI)>

Production Example 1 (Production Method of 1,4-bis(isocyanatomethyl)cyclohexane (1) (hereinafter, referred to as 1,4-BIC (1))

While 1,4-BIC (2) described in Production Example 2 to be described later was nitrogen-purged, it filled an oil can to be then allowed to stand for two weeks in an incubator at 1° C. The obtained condensate was quickly decompressed and filtered by using a membrane filter having a 4 μm mesh, so that a liquid phase portion was removed and a solid phase portion was obtained. The above-described operation was repeated with respect to the solid phase portion, so that 1,4-BIC (1) was obtained. The purity of the obtained 1,4-BIC (1) with gas chromatography measurement was 99.9%, the color phase with APHA measurement was 5, and a ratio of trans-isomer/cis-isomer with $^{13}$C-NMR measurement was 99.5/0.5. The concentration of the hydrolysable chlorine (hereinafter, referred to as HC concentration) was 18 ppm.

Production Example 2 (Production Method of 1,4-bis(isocyanatomethyl)cyclohexane (2) (hereinafter, referred to as 1,4-BIC (2)))

In conformity with the description of Production Example 6 of Japanese Unexamined Patent Publication No. 2014-55229, a 1,4-bis(aminomethyl)cyclohexane having a ratio of trans-isomer/cis-isomer of 98/2 and having the purity of 99.5% or more was obtained at a yield of 92%.

Thereafter, in conformity with the description of Production Example 1 of Japanese Unexamined Patent Publication No. 2014-55229, a heat and cold two-step phosgenation method was carried out by using the 1,4-bis(aminomethyl)cyclohexane as a material under pressure, so that 382 parts by mass of 1,4-BIC (2) was obtained.

The purity of the obtained 1,4-BIC (2) with gas chromatography measurement was 99.9%, the color phase with APHA measurement was 5, and a ratio of trans-isomer/cis-isomer with $^{13}$C-NMR measurement was 98/2. The HC concentration was 18 ppm.

Production Example 3 (Production Method of 1,4-bis(isocyanatomethyl)cyclohexane (3) (hereinafter, referred to as 1,4-BIC (3)))

A four-neck flask equipped with a stirrer, a thermometer, a reflux tube, and a nitrogen inlet tube was charged with 789 parts by mass of 1,4-BIC (2) obtained in Production Example 2 and 211 parts by mass of 1,4-BIC (6) obtained in Production Example 6 to be described later to be then stirred at a room temperature for 1 hour under a nitrogen atmosphere. The purity of the obtained 1,4-BIC (3) with gas chromatography measurement was 99.9%, the color phase with APHA measurement was 5, and a ratio of trans-isomer/cis-isomer with $^{13}$C-NMR measurement was 86/14. The HC concentration was 19 ppm.

Production Example 4 (Production Method of 1,4-bis(isocyanatomethyl)cyclohexane (4) (hereinafter, referred to as 1,4-BIC (4)))

A four-neck flask equipped with a stirrer, a thermometer, a reflux tube, and a nitrogen inlet tube was charged with 561 parts by mass of 1,4-BIC (2) obtained in Production Example 2 and 439 parts by mass of 1,4-BIC (6) obtained in Production Example 6 to be described later to be then stirred at a room temperature for 1 hour under a nitrogen atmosphere. The purity of the obtained 1,4-BIC (4) with gas chromatography measurement was 99.9%, the color phase with APHA measurement was 5, and a ratio of trans-isomer/cis-isomer with $^{13}$C-NMR measurement was 73/27. The HC concentration was 20 ppm.

Production Example 5 (Production Method of 1,4-bis (isocyanatomethyl)cyclohexane (5) (hereinafter, referred to as 1,4-BIC (5)))

A four-neck flask equipped with a stirrer, a thermometer, a reflux tube, and a nitrogen inlet tube was charged with 474 parts by mass of 1,4-BIC (2) obtained in Production Example 2 and 526 parts by mass of 1,4-BIC (6) obtained in Production Example 6 to be described later to be then stirred at a room temperature for 1 hour under a nitrogen atmosphere. The purity of the obtained 1,4-BIC (5) with gas chromatography measurement was 99.9%, the color phase with APHA measurement was 5, and a ratio of trans-isomer/cis-isomer with $^{13}$C-NMR measurement was 68/32. The HC concentration was 21 ppm.

Production Example 6 (Production Method of 1,4-bis (isocyanatomethyl)cyclohexane (6) (hereinafter, referred to as 1,4-BIC (6)))

By using a 1,4-bis(aminomethyl)cyclohexane (manufactured by Tokyo Chemical Industry Co., Ltd.) having a ratio of trans-isomer/cis-isomer of 41/59 with $^{13}$C-NMR measurement as a material, 388 parts by mass of 1,4-BIC (6) was obtained in conformity with the description of Production Example 1 of Japanese Unexamined Patent Publication No. 2014-55229.

The purity of the obtained 1,4-BIC (6) with gas chromatography measurement was 99.9%, the color phase with APHA measurement was 5, and a ratio of trans-isomer/cis-isomer with $^{13}$C-NMR measurement was 41/59. The HC concentration was 22 ppm.

<First Step: Preparation of Reaction Mixture Containing Isocyanate Group-Terminated Prepolymer>

Synthesis Examples 1 to 19

The polyisocyanate component (a) reacted with the macropolyol component ($b^1$) at such a ratio that the equivalent ratio (isocyanate group/hydroxyl group) of the isocyanate group in the polyisocyanate component (a) with respect to the hydroxyl group in the macropolyol component ($b^1$) was values described in Tables 1 to 2.

To be specific, a four-neck flask equipped with a stirrer, a thermometer, a reflux tube, and a nitrogen inlet tube was charged with the polyisocyanate component (a) and the macropolyol component ($b^1$) with the mass ratio described in Tables 1 to 2 to be then stirred at 80° C. for 1 hour under a nitrogen atmosphere.

Thereafter, a 4 mass % solution of tin octylate (trade name: STANOCT, manufactured by API Corporation) was added so as to be 5 ppm as a catalyst with respect to the total amount of the polyisocyanate component (a) and the macropolyol component ($b^1$), and the reaction was progressed until the isocyanate group content described in Tables 1 to 2 under a temperature control of 80° C. and a nitrogen gas stream, while the resulting mixture was stirred and mixed, so that the reaction mixtures (a) to (s) containing the isocyanate group-terminated polyurethane prepolymer were obtained.

<Second Step: Synthesis of Polyurethane Resin>

Examples 1 to 12, Examples 14 to 16, Example 18, and Comparative Examples 1 to 2

The concentration of the isocyanate group of the reaction mixture containing the isocyanate group-terminated prepolymer by controlling the temperature to 80° C. was measured.

Then, the macropolyol component ($b^2$) was weighed in a stainless steel cup by controlling the temperature to 80° C. so that the equivalent ratio (isocyanate group/hydroxyl group) of the isocyanate group in the reaction mixture with respect to the hydroxyl group in the macropolyol component ($b^2$) was 1.05.

Next, the reaction mixture (containing the isocyanate group-terminated prepolymer) whose temperature was controlled to 80° C. was weighed in another stainless steel cup, and with respect to 100 parts by mass of the total amount of the reaction mixture (containing the isocyanate group-terminated prepolymer) and the macropolyol component ($b^2$), 0.3 parts by mass of IRGANOX 245 (manufactured by BASF Japan Ltd, heat resistant stabilizer), 0.3 parts by mass of TINUVIN 234 (manufactured by BASF Japan Ltd, ultraviolet absorber), and 0.3 parts by mass of ADEKA STAB LA-72 (manufactured by ADEKA CORPORATION, HALS) were added to the reaction mixture (containing the isocyanate group-terminated prepolymer).

Also, a 4 mass % solution of tin octylate (trade name: STANOCT, manufactured by API Corporation) was added to the reaction mixture (containing the isocyanate group-terminated prepolymer) so as to be 50 ppm as a catalyst with respect to the total amount of the polyisocyanate component (a) and the macropolyol component ($b^2$).

Next, the reaction mixture (containing the isocyanate group-terminated prepolymer) was preliminarily stirred and mixed in an oil bath of 80° C. for 3 minutes by using a high-speed stirring disper under stirring of 500 to 1500 rpm.

Next, the macropolyol component ($b^2$) weighed in advance whose temperature was controlled to 80° C. was added to the reaction mixture (containing the isocyanate group-terminated prepolymer) to be stirred and mixed for 3 to 10 minutes by using a high-speed stirring disper under stirring of 500 to 1500 rpm.

Next, a liquid mixture was poured into a mold (sheet shape having a thickness of 2 mm, button shape having a diameter of 29 mm and a thickness of 12 mm, block shape having a length of 10 cm, a width of 10 cm, and a thickness of 12 mm) whose temperature was controlled to 135° C. in advance to react at 135° C. for 2 hours, and thereafter, the temperature was lowered to 100° C. to continue the reaction for 20 hours.

In this manner, the polyurethane resins (A) to (L), the polyurethane resins (N) to (P), and the polyurethane resins (R) to (T) were obtained.

<One Shot Method: Synthesis of Polyurethane Resin>

Examples 13 and 17

As described in Tables 3 to 5, the mass ratio of the macropolyol component (b) to the polyisocyanate component (a) was obtained so that the equivalent ratio (isocyanate group/hydroxyl group) of the isocyanate group in the polyisocyanate component (a) with respect to the hydroxyl group in the macropolyol component (b) was 1.05.

Then, the macropolyol component (b) whose temperature was controlled to 80° C. in advance was weighed in a stainless steel cup, and with respect to 100 parts by mass of the total amount of the isocyanate component (a) and the macropolyol component (b), 0.3 parts by mass of IRGANOX 245 (manufactured by BASF Japan Ltd, heat resistant stabilizer), 0.3 parts by mass of TINUVIN 234 (manufactured by BASF Japan Ltd, ultraviolet absorber), and 0.3 parts by mass of ADEKA STAB LA-72 (manufactured by ADEKA CORPORATION, HALS) were added to the macropolyol component (b).

Also, a 4 mass % solution of tin octylate (trade name: STANOCT manufactured by API Corporation) was added to the macropolyol component (b) so as to be 50 ppm as a catalyst with respect to the total amount of the isocyanate component (a) and the macropolyol component (b).

Next, the macropolyol component (b) was preliminarily stirred and mixed in an oil bath of 80° C. for 3 minutes by using a high-speed stirring disper under stirring of 500 to 1500 rpm.

Next, the isocyanate component (a) weighed in advance whose temperature was controlled to 80° C. was added to the macropolyol component (b) to be stirred and mixed for 3 to 10 minutes by using a high-speed stirring disper under stirring of 500 to 1500 rpm.

Next, the liquid mixture was poured into a mold (sheet shape having a thickness of 2 mm, button shape having a diameter of 29 mm and a thickness of 12 mm, block shape having a length of 10 cm, a width of 10 cm, and a thickness of 12 mm) whose temperature was controlled to 135° C. in advance to react at 135° C. for 2 hours, and thereafter, the temperature was lowered to 100° C. to continue the reaction for 20 hours.

In this manner, a polyurethane resin (M) and a polyurethane resin (Q) were obtained.

<Second Step by Using Short-Chain Polyol: Synthesis of Polyurethane Resin>

Comparative Examples 3 to 5

Polyurethane resins (U) to (W) were obtained in the same manner as that of Example 1, except that a short-chain diol (c) was used instead of the macropolyol component ($b^2$) and a catalyst addition amount was changed to 20 ppm in accordance with the formulations described in Tables 3 to 5.

In Comparative Example 4, along with the catalyst, as a plasticizer, DINA (manufactured by DAIHACHI CHEMICAL INDUSTRY CO., LTD., plasticizer) was added so as to be 15 mass % with respect to the total amount of the prepolymer (s) and the short-chain diol (c).

3) Properties Measurement of Polyurethane Resin
<Shore A Hardness>

In accordance with JIS K7311 (1995), an ASKER A durometer was horizontally pushed toward a polyurethane block having a length of 10 cm, a width of 10 cm, and a thickness of 12 mm, and a stable value of a pointer in 15 seconds was read.

<Tear Strength (Unit: kN/m)>
By using a right-angled tear test piece fabricated from the polyurethane sheet having a thickness of 2 mm in accordance with JIS K7311 (1995), the measurement of the tear strength was carried out with a tensile testing machine (part number: Model 205N, manufactured by INTESCO Co., Ltd.) under the conditions of a tensile rate of 300 mm/min.

<Breaking Strength (Unit: MPa) and Breaking Elongation (Unit: %)>
By using a JIS No. 4 dumbbell-type test piece fabricated from the polyurethane sheet having a thickness of 2 mm in accordance with JIS K 7311 (1995), the measurement of the breaking strength and the breaking elongation was carried out with a tensile testing machine (part number: Model 205N, manufactured by INTESCO Co., Ltd.) under the conditions of a tensile rate of 300 mm/min and a gauge length of 20 mm.

<Rebound Resilience (Unit: %)>
By using a polyurethane resin sample in a button shape having a diameter of 29 mm and a thickness of 12 mm, the rebound resilience was measured in accordance with JIS K 7311 (1995).

<Compression Permanent Set (Unit: %)>
By using a polyurethane resin sample having a diameter of 29 mm and a thickness of 12 mm, the compression permanent set was measured under the conditions of 70° C., a compression of 25%, and 22 hours in accordance with JIS K 6262.

<Softening Temperature (unit: ° C.)>
A strip-shaped test piece having a width of 10 mm was cut from the polyurethane sheet having a thickness of 2 mm, and by using a dynamic viscoelasticity measurement device (manufactured by IT Keisoku Seigyo Co., Ltd., part number: DVA-220), the dynamic viscoelasticity spectrum was measured under the conditions of a measurement starting temperature of −100° C., a temperature rising rate of 5° C./min, a tensile mode, a gauge length of 20 mm, a static/dynamic stress ratio of 1.8, and a measurement frequency of 10 Hz.

Then, the softening temperature was defined as a temperature at which the storage elastic modulus E' showed $1 \times 10^6$ Pa (that is, the temperature at which the storage elastic modulus E' reached $1 \times 10^6$ Pa in the dynamic viscoelasticity spectrum in a temperature region (rubber-state region) that was higher than the glass transition temperature (Tg)).

By the above-described dynamic viscoelasticity measurement, the storage elastic modulus $E'_{50}$ at 50° C. and the storage elastic modulus $E'_{150}$ at 150° C. were confirmed, and the ratio thereof ($E'_{150}/E'_{50}$) was calculated.

<Bleeding Resistance>
A polyurethane sheet having a thickness of 2 mm was allowed to stand for one week under the conditions of 23° C. and relative humidity of 55%, and thereafter, the surface thereof was visually observed.

A case where a liquid bleeding material was confirmed was defined as "Bad", and a case where a bleeding material was not confirmed was defined as "Good".

<Low Tackiness>
In the dynamic viscoelasticity measurement in the above-described measurement of the softening temperature, a loss factor (tan δ) at 23° C. was calculated to be evaluated as a reference of the tackiness.

It was defined that the smaller the value of the loss factor (tan δ) was, the more excellent the low tackiness was.

TABLE 1

| | No. | | | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 |
|---|---|---|---|---|---|---|---|---|---|---|---|
| Reaction Mixture (First Step) | | | | a | b | c | d | e | f | g | h |
| Mixing Formulation parts by mass) | Polyisocyanate Component (a) | 1,4-BIC (1) | Trans 99.5% | — | — | — | — | — | — | — | — |
| | | 1,4-BIC (2) | Trans 98% | — | — | — | — | — | — | — | — |
| | | 1,4-BIC (3) | Trans 86% | 89.6 | 58.3 | 29.1 | 19.4 | 14.6 | 29.1 | 29.1 | 29.1 |
| | | 1,4-BIC (4) | Trans 73% | — | — | — | — | — | — | — | — |
| | | 1,4-BIC (5) | Trans 68% | — | — | — | — | — | — | — | — |
| | | 1,3-BIC | | — | — | — | — | — | — | — | — |

TABLE 1-continued

| No. | | | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 |
|---|---|---|---|---|---|---|---|---|---|---|
| Macropolyol Component ($b^1$) | Polyol Type | Number Average Molecular Weight | | | | | | | | |
| | b-1) PTMEG | 250 | — | — | — | — | — | — | — | — |
| | b-2) PTMEG | 650 | 100 | — | — | — | — | — | — | — |
| | b-3) PTMEG | 1000 | — | 100 | — | — | — | — | — | — |
| | b-4) PTMEG | 2000 | — | — | 100 | — | — | — | — | — |
| | b-5) PTMEG | 3000 | — | — | — | 100 | — | — | — | — |
| | b-6) PCL | 2000 | — | — | — | — | — | 100 | — | — |
| | b-7) Poly-carbonate Diol | 2000 | — | — | — | — | — | — | 100 | — |
| | b-8) Poly-butylene Adipate | 2000 | — | — | — | — | — | — | — | 100 |
| | b-9) PEG | 4000 | — | — | — | — | 100 | — | — | — |
| | b-10) PEG | 6000 | — | — | — | — | — | — | — | — |
| | b-11) PTXG | 1800 | — | — | — | — | — | — | — | — |
| Equivalent Ratio (NCO/OH) | | | 3 | 3 | 3 | 3 | 3 | 3 | 3 | 3 |
| Concentration of Isocyanate Group (%) | | | 13.6 | 10.6 | 6.5 | 4.7 | 3.7 | 6.5 | 6.5 | 6.5 |

TABLE 2

| No. | | | | Synthesis Ex. 9 | Synthesis Ex. 10 | Synthesis Ex. 11 | Synthesis Ex. 12 | Synthesis Ex. 13 | Synthesis Ex. 14 |
|---|---|---|---|---|---|---|---|---|---|
| | Reaction Mixture (First Step) | | | i | j | k | l | m | n |
| Mixing Formulation (parts by mass) | Polyisocyanate Component (a) | 1,4-BIC(1) | Trans 99.5% | — | — | — | 29.1 | — | — |
| | | 1,4-BIC(2) | Trans 98% | — | — | 29.1 | — | — | — |
| | | 1,4-BIC(3) | Trans 86% | — | — | — | — | 32.4 | 14.6 |
| | | 1,4-BIC(4) | Trans 73% | — | 29.1 | — | — | — | — |
| | | 1,4-BIC(5) | Trans 68% | 29.1 | — | — | — | — | — |
| | | 1,3-BIC | | — | — | — | — | — | — |
| Macropolyol Component ($b^1$) | Polyol Type | Number Average Molecular Weight | | | | | | | |
| | b-1) PTMEG | 250 | | — | — | — | — | — | — |
| | b-2) PTMEG | 650 | | — | — | — | — | — | — |
| | b-3) PTMEG | 1000 | | — | — | — | — | — | — |
| | b-4) PTMEG | 2000 | | 100 | 100 | 100 | 100 | — | 100 |
| | b-5) PTMEG | 3000 | | — | — | — | — | — | — |
| | b-6) PCL | 2000 | | — | — | — | — | — | — |
| | b-7) Poly-carbonate Diol | 2000 | | — | — | — | — | — | — |
| | b-8) Poly-butylene Adipate | 2000 | | — | — | — | — | — | — |
| | b-9) PEG | 4000 | | — | — | — | — | — | — |
| | b-10) PEG | 6000 | | — | — | — | — | — | — |
| | b-11) PTXG | 1800 | | — | — | — | — | 100 | — |
| Equivalent Ratio (NCO/OH) | | | | 3 | 3 | 3 | 3 | 3 | 1.5 |
| Concentration of Isocyanate Group (%) | | | | 6.5 | 6.5 | 6.5 | 6.5 | 7.1 | 1.8 |

| No. | | | | Synthesis Ex. 15 | Synthesis Ex. 16 | Synthesis Ex. 17 | Synthesis Ex. 18 | Synthesis Ex. 19 |
|---|---|---|---|---|---|---|---|---|
| | Reaction Mixture (First Step) | | | o | p | q | r | s |
| Mixing Formulation (parts by mass) | Polyisocyanate Component (a) | 1,4-BIC (1) | Trans 99.5% | — | — | — | — | — |
| | | 1,4-BIC (2) | Trans 98% | — | — | — | — | — |
| | | 1,4-BIC (3) | Trans 86% | 68.0 | — | 233 | 9.7 | 23.1 |
| | | 1,4-BIC (4) | Trans 73% | — | — | — | — | — |
| | | 1,4-BIC (5) | Trans 68% | — | — | — | — | — |
| | | 1,3-BIC | | — | 29.1 | — | — | — |
| Macropolyol Component ($b^1$) | Polyol Type | Number Average Molecular Weight | | | | | | |
| | b-1) PTMEG | 250 | | — | — | 100 | — | — |
| | b-2) PTMEG | 650 | | — | — | — | — | — |
| | b-3) PTMEG | 1000 | | — | — | — | — | — |
| | b-4) PTMEG | 2000 | | 100 | 100 | — | — | — |

TABLE 2-continued

|  |  |  |  |  |  |  |  |
|---|---|---|---|---|---|---|---|
|  | b-5) PTMEG | 3000 | — | — | — | — | — |
|  | b-6) PCL | 2000 | — | — | — | — | — |
|  | b-7) Polycarbonate Diol | 2000 | — | — | — | — | — |
|  | b-8) Polybutylene Adipate | 2000 | — | — | — | — | 100 |
|  | b-9) PEG | 4000 | — | — | — | — | — |
|  | b-10) PEG | 6000 | — | — | — | 100 | — |
|  | b-11) PTXG | 1800 | — | — | — | — | — |
| Equivalent Ratio (NCO/OH) |  |  | 7 | 3 | 3 | 3 | 2.4 |
| Concentration of Isocyanate Group (%) |  |  | 15.0 | 6.5 | 20.2 | 2.6 | 4.7 |

TABLE 3

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Polyurethane Resin | | | A | B | C | D | E | F | G | H |
| Reaction Mixture (First Step) | | | a | b | c | d | e | f | g | h |
| Concentration of Isocyanate Group (%) of Reaction Mixture (First Step) | | | 13.6 | 10.6 | 6.5 | 4.7 | 3.7 | 6.5 | 6.5 | 6.5 |
| Equivalent Ratio (NCO/OH) in First Step | | | 3 | 3 | 3 | 3 | 3 | 3 | 3 | 3 |
| Polyisocyanate Component (a) Used = Used in Synthesis Examples (One Shot Method: Mixing parts by mass) | 1,4-BIC (1) | Trans 99.5% | — | — | — | — | — | — | — | — |
| | 1,4-BIC (2) | Trans 98% | — | — | — | — | — | — | — | — |
| | 1,4-BIC (3) | Trans 86% | Used | Used | Used | Used | Used | Used | Used | Used |
| | 1,4-BIC (4) | Trans 73% | — | — | — | — | — | — | — | — |
| | 1,4-BIC (5) | Trans 68% | — | — | — | — | — | — | — | — |
| | 1,3-BIC | | — | — | — | — | — | — | — | — |
| Macropolyol Component (b2) Mixing parts by mass to 100 parts by mass of Reaction Mixture (One Shot Method: Mixing parts by mass) | Polyol Type | Number Average Molecular Weight | | | | | | | | |
| | b-2) PTMEG | 650 | 100 | — | — | — | — | — | — | — |
| | b-3) PTMEG | 1000 | — | 120 | — | — | — | — | — | — |
| | b-4) PTMEG | 2000 | — | — | 148 | — | — | — | — | — |
| | b-5) PTMEG | 3000 | — | — | — | 160 | — | — | — | — |
| | b-6) PCL | 2000 | — | — | — | — | — | 148 | — | — |
| | b-7) Polycarbonate Diol | 2000 | — | — | — | — | — | — | 148 | — |
| | b-8) Polybutylene Adipate | 2000 | — | — | — | — | — | — | — | 148 |
| | b-9) PEG | 4000 | — | — | — | — | 166 | — | — | — |
| | b-11) PTXG | 1800 | — | — | — | — | — | — | — | — |
| | b-12) EP-505S | 3000 | — | — | — | — | — | — | — | — |
| Evaluation | Hardness | A | 79 | 75 | 59 | 55 | 51 | 62 | 64 | 63 |
| | Tear Strength | kN/m | 45 | 38 | 33 | 27 | 23 | 38 | 43 | 40 |
| | Breaking Strength | MPa | 30 | 35 | 32 | 27 | 24 | 37 | 39 | 37 |
| | Breaking Elongation | % | 380 | 500 | 800 | 840 | 850 | 680 | 600 | 650 |
| | Rebound Resilience | % | 60 | 67 | 78 | 80 | 75 | 73 | 68 | 74 |
| | Compression Permanent Set | % | 18 | 14 | 13 | 10 | 12 | 12 | 12 | 11 |
| | Softening Temperature (E' = Temperature of $10^6$ Pa) | °C. | 227 | 226 | 222 | 220 | 215 | 227 | 230 | 229 |
| | Storage Elastic Modulus at 50° C. (E'50) | MPa | 12.5 | 5.8 | 4.6 | 4.5 | 4.0 | 4.8 | 5.0 | 4.9 |
| | Storage Elastic Modulus at 150° C. (E'150) | MPa | 12.0 | 5.7 | 4.1 | 4.0 | 3.7 | 4.3 | 4.6 | 4.5 |
| | Ratio of Storage Elastic Modulus (E'150/E'50) | — | 0.96 | 0.98 | 0.89 | 0.89 | 0.93 | 0.90 | 0.92 | 0.92 |
| | Bleeding Properties | — | Good | Good | Good | Good | Good | Good | Good | Good |
| | Tackiness (tan δ at 2.3° C.) | — | 0.016 | 0.018 | 0.032 | 0.040 | 0.061 | 0.038 | 0.045 | 0.032 |

TABLE 4

| | | | Ex. 9 | Ex. 10 | Ex. 11 | Ex. 12 | Ex. 13 | Ex. 14 |
|---|---|---|---|---|---|---|---|---|
| | Polyurethane Resin | | I | J | K | L | M | N |
| | Reaction Mixture (First Step) | | i | j | k | l | — | m |
| | Concentration of Isocyanate Group (%) of Reaction Mixture (First Step) | | 6.5 | 6.5 | 6.5 | 6.5 | — | 7.1 |
| | Equivalent Ratio (NCO/OH) in First Step | | 3 | 3 | 3 | 3 | One Shot | 3 |
| Polyisocyanate Component (a) Used = Used in Synthesis Examples (One Shot Method: Mixing parts by mass) | 1,4-BIC (1) | Trans 99.5% | — | — | — | Used | — | — |
| | 1,4-BIC (2) | Trans 98% | — | — | Used | — | — | — |
| | 1,4-BIC (3) | Trans 86% | — | — | — | — | 10.2 | Used |
| | 1,4-BIC (4) | Trans 73% | — | Used | — | — | — | — |
| | 1,4-BIC (5) | Trans 68% | Used | — | — | — | — | — |
| | 1,3-BIC | | — | — | — | — | — | — |
| Macropolyol Component (b²) Mixing parts by mass to 100 parts by mass of Reaction Mixture (One Shot Method: Mixing parts by mass) | Polyol Type | Number Average Molecular Weight | | | | | | |
| | b-2) PTMEG | 650 | — | — | — | — | — | — |
| | b-3) PTMEG | 1000 | — | — | — | — | — | — |
| | b-4) PTMEG | 2000 | 148 | 148 | 148 | 148 | — | — |
| | b-5) PTMEG | 3000 | — | — | — | — | — | — |
| | b-6) PCL | 2000 | — | — | — | — | — | — |
| | b-7) Polycarbonate Diol | 2000 | — | — | — | — | — | — |
| | b-8) Polybutylene Adipate | 2000 | — | — | — | — | — | — |
| | b-9) PEG | 4000 | — | — | — | — | — | — |
| | b-11) PTXG | 1800 | — | — | — | — | — | 144 |
| | b-12) EP-505S | 3000 | — | — | — | — | 100 | — |
| Evalution | Hardness | A | 51 | 55 | 64 | 70 | 53 | 45 |
| | Tear Strength | kN/m | 22 | 28 | 40 | 30 | 13 | 18 |
| | Breaking Strength | MPa | 18 | 22 | 39 | 27 | 12 | 11 |
| | Breaking Elongation | % | 550 | 620 | 830 | 650 | 350 | 1000 |
| | Rebound Resilience | % | 69 | 73 | 84 | 78 | 67 | 74 |
| | Compression Permanent Set | % | 20 | 16 | 11 | 17 | 13 | 23 |
| | Softening Temperautre (E' = Temperature of $10^6$ Pa) | °C. | 205 | 216 | 229 | 220 | 231 | 218 |
| | Storage Elastic Modulus at 50° C. (E'50) | MPa | 3.8 | 4.3 | 5.2 | 5.6 | 4.3 | 3.7 |
| | Storage Elastic Modulus at 150° C. (E'150) | MPa | 3.6 | 4.2 | 5.0 | 5.4 | 4.9 | 3.3 |
| | Ratio of Storage Elastic Modulus (E'150/E'50) | — | 0.95 | 0.98 | 0.96 | 0.96 | 1.14 | 0.89 |
| | Bleeding Properties | — | Good | Good | Good | Good | Good | Good |
| | Tackiness (tan δ at 23° C.) | — | 0.088 | 0.059 | 0.015 | 0.014 | 0.094 | 0.086 |

| | | | Ex. 15 | Ex. 16 | Ex. 17 | Ex. 18 |
|---|---|---|---|---|---|---|
| | Polyurethane Resin | | O | P | Q | R |
| | Reaction Mixture (First Step) | | n | o | — | p |
| | Concentration of Isocyanate Group (%) of Reaction Mixture (First Step) | | 1.8 | 15.0 | — | 6.5 |
| | Equivalent Ratio (NCO/OH) in First Step | | 1.5 | 7 | One Shot | 3 |
| Polyisocyanate Component (a) Used = Used in Synthesis Examples (One Shot Method: Mixing parts by mass) | 1,4-BIC (1) | Trans 99.5% | — | — | — | — |
| | 1,4-BIC (2) | Trans 98% | — | — | — | — |
| | 1,4-BIC (3) | Trans 86% | Used | Used | 10.2 | — |
| | 1,4-BIC (4) | Trans 73% | — | — | — | — |
| | 1,4-BIC (5) | Trans 68% | — | — | — | — |
| | 1,3-BIC | | — | — | — | Used |
| Macropolyol Component (b²) Mixing parts by mass to 100 parts by mass of Reaction Mixture (One Shot Method: Mixing parts by mass) | Polyol Type | Number Average Molecular Weight | | | | |
| | b-2) PTMEG | 650 | — | — | — | — |
| | b-3) PTMEG | 1000 | — | — | — | — |
| | b-4) PTMEG | 2000 | 42 | 340 | 100 | 148 |
| | b-5) PTMEG | 3000 | — | — | — | — |
| | b-6) PCL | 2000 | — | — | — | — |
| | b-7) Polycarbonate Diol | | | | | |

TABLE 4-continued

|  |  |  |  |  |  |  |  |
|---|---|---|---|---|---|---|---|
|  |  | b-8) Polybutylene Adipate | 2000 | — | — | — | — |
|  |  | b-9) PEG | 4000 | — | — | — | — |
|  |  | b-11) PTXG | 1800 | — | — | — | — |
|  |  | b-12) EP-505S | 3000 | — | — | — | — |
| Evalution | Hardness |  | A | 62 | 63 | 64 | 56 |
|  | Tear Strength |  | kN/m | 24 | 23 | 19 | 19 |
|  | Breaking Strength |  | MPa | 18 | 19 | 17 | 17 |
|  | Breaking Elongation |  | % | 640 | 590 | 460 | 840 |
|  | Rebound Resilience |  | % | 71 | 73 | 70 | 78 |
|  | Compression Permanent Set |  | % | 19 | 17 | 20 | 18 |
|  | Softening Temperautre (E' = Temperature of $10^6$ Pa) |  | °C. | 207 | 206 | 204 | 220 |
|  | Storage Elastic Modulus at 50° C. (E'50) |  | MPa | 4.9 | 4.9 | 5.0 | 4.5 |
|  | Storage Elastic Modulus at 150° C. (E'150) |  | MPa | 4.5 | 4.6 | 4.6 | 4.4 |
|  | Ratio of Storage Elastic Modulus (E'150/E'50) |  | — | 0.92 | 0.94 | 0.92 | 0.98 |
|  | Bleeding Properties |  | — | Good | Good | Good | Good |
|  | Tackiness (tan δ at 23° C.) |  | — | 0.045 | 0.049 | 0.055 | 0.088 |

TABLE 5

| No. |  |  | Comp. Ex. 1 | Comp. Ex. 2 | Comp. Ex. 3 | Comp. Ex. 4 | Comp. Ex. 5 |
|---|---|---|---|---|---|---|---|
| Polyurethane Resin |  |  | S | T | U | V | W |
| Reaction Mixture (First Step) |  |  | q | r | s | s | s |
| Concentration of Isocyanate Group (%) of Reaction Mixture (First Step) |  |  | 20.2 | 2.6 | 4.7 | 4.7 | 4.7 |
| Equivalent Ratio (NCO/OH) in First Step |  |  | 3 | 3 | 2.4 | 2.4 | 2.4 |
| Polyisocyanate Component (a) Used = Used in Synthesis Examples | 1,4-BIC(3) | Trans 86% | Used | Used | Used | Used | Used |
| Macropolyol Component ($b^2$) Mixing parts by mass to 100 parts by mass of Reaction Mixture | Polyol Type | Number Average Molecular Weight |  |  |  |  |  |
|  | b-1) PTMEG | 250 | 57 | — | — | — | — |
|  | b-10) PEG | 6000 | — | 174 | — | — | — |
| Short-Chain Diol (c) Mixing parts by mass to 100 parts by mass of Reaction Mixture | 1,4-BD |  | — | — | 4.8 | 4.8 | — |
|  | TMP |  | — | — | — | — | 4.8 |
| Plasticizer |  |  | Absence | Absence | Absence | Presence | Absence |
| Evaluation | Hardness | A | 86 | 45 | 92 | 60 | 66 |
|  | Tear Strength | kN/m | 43 | 15 | 135 | 25 | 8 |
|  | Breaking Strength | MPa | 27 | 9 | 58 | 20 | 2 |
|  | Breaking Elongation | % | 170 | 880 | 600 | 810 | 90 |
|  | Rebound Resilience | % | 48 | 65 | 67 | 72 | 70 |
|  | Compression Permanent Set | % | 30 | 28 | 23 | 21 | 2 |
|  | Softening Temperautre (E' = Temperature of $10^6$ Pa) | °C. | 228 | 189 | 215 | 180 | 250 |
|  | Storage Elastic Modulus at 50° C. (E'50) | MPa | 67 | 3.5 | 107 | 4.7 | 5.8 |
|  | Storage Elastic Modulus at 150° C. (E'150) | MPa | 62 | 3.2 | 100 | 4.3 | 8.7 |
|  | Ratio of Storage Elastic Modulus (E'150/E') | — | 0.93 | 0.91 | 0.93 | 0.91 | 1.50 |
|  | Bleeding Properties | — | Good | Good | Good | Bad | Good |
|  | Tackiness (tan δ at 23° C.) | — | 0.015 | 0.136 | 0.025 | 0.035 | 0.039 |

The invention claimed is:

1. A polyurethane resin comprising:
   a reaction product of a material component consisting of:
   a polyisocyanate component containing a bis(isocyanatomethyl)cyclohexane; and
   a macropolyol component having a number average molecular weight of above 400 and 5000 or less,
   wherein
   the shore A hardness thereof is 80 or less,
   a temperature at which a storage elastic modulus E' thereof shows $1 \times 10^6$ Pa is 200° C. or more, and
   a ratio ($E'_{150}/E'_{50}$) of a storage elastic modulus $E'_{150}$ at 150° C. with respect to a storage elastic modulus $E'_{50}$ at 50° C. is 0.1 or more and 1.4 or less.

2. The polyurethane resin according to claim 1, wherein the bis(isocyanatomethyl)cyclohexane comprises a 1,4-bis(isocyanatomethyl)cyclohexane.

3. The polyurethane resin according to claim 2, wherein the 1,4-bis(isocyanatomethyl)cyclohexane contains a trans-isomer at a ratio of 70 mol % or more and 99 mol % or less.

4. The polyurethane resin according to claim 1, wherein the macropolyol component consists of a bifunctional polyol.

5. The polyurethane resin according to claim 1, wherein the macropolyol component contains a crystalline macropolyol that is solid at 15° C.

6. A method for producing a polyurethane resin comprising:
   a first step of obtaining a reaction mixture containing an isocyanate group-terminated prepolymer by reacting a material component consisting of a polyisocyanate component containing a bis(isocyanatomethyl)cyclohexane and a macropolyol component having a number average molecular weight of above 400 and 5000 or less, and
   a second step of obtaining a polyurethane resin by reacting the reaction mixture obtained in the first step with a macropolyol component having a number average molecular weight of above 400 and 5000 or less,
   wherein
   in the first step, an equivalent ratio of an isocyanate group in the polyisocyanate component with respect to a hydroxyl group in the macropolyol component is 2 or more and 5 or less.

7. A molded article containing the polyurethane resin according to claim 1.

* * * * *